(12) United States Patent
Lathan (10) Patent No.: US 11,059,681 B2
(45) Date of Patent: Jul. 13, 2021

(54) SYSTEMS AND METHODS FOR PNEUMATIC TUBE SMART CARRIER TRACKING

(71) Applicant: Carl P. Lathan, Longmont, CO (US)

(72) Inventor: Carl P. Lathan, Longmont, CO (US)

( * ) Notice: Subject to any disclaimer, the term of this patent is extended or adjusted under 35 U.S.C. 154(b) by 0 days.

(21) Appl. No.: 16/874,957

(22) Filed: May 15, 2020

(65) Prior Publication Data

US 2020/0361721 A1    Nov. 19, 2020

Related U.S. Application Data (60) Provisional application No. 62/849,654, filed on May 17, 2019.

(51) Int. Cl.

| | | |
|---|---|---|
| *B65G 51/36* | (2006.01) | |
| *B65G 51/42* | (2006.01) | |
| *B65G 51/06* | (2006.01) | |
| *H04W 4/33* | (2018.01) | |
| *H04W 88/08* | (2009.01) | |
| *H04W 4/029* | (2018.01) | |

(52) U.S. Cl.
CPC ............ *B65G 51/42* (2013.01); *B65G 51/06* (2013.01); *H04W 4/029* (2018.02); *H04W 4/33* (2018.02); *H04W 88/085* (2013.01); *B65G 2203/04* (2013.01)

(58) Field of Classification Search
USPC ........ 406/7, 36, 37, 184, 198; 700/225, 226, 700/230
See application file for complete search history.

(56) References Cited

U.S. PATENT DOCUMENTS

| | | | | |
|---|---|---|---|---|
| 3,761,039 | A * | 9/1973 | Hazell ................... | B65G 51/26 406/111 |
| 4,325,126 | A * | 4/1982 | Thoma ................... | B65G 51/46 198/349 |
| 4,941,181 | A * | 7/1990 | Igarashi ............. | G06K 17/0022 382/100 |
| 5,234,292 | A * | 8/1993 | Lang ...................... | B65G 51/40 406/1 |
| 5,751,581 | A * | 5/1998 | Tau ..................... | G05B 19/4183 700/115 |
| 6,477,442 | B1 * | 11/2002 | Valerino, Sr. .......... | B65G 51/34 414/730 |
| 6,672,808 | B1 | 1/2004 | McIntyre et al. | |

(Continued)

OTHER PUBLICATIONS

Specification, Claims, Abstract, and Drawings for U.S. Appl. No. 61/700,383, dated Sep. 13, 2012, 58 pages.

(Continued)

*Primary Examiner* — Joseph A Dillon, Jr.
(74) *Attorney, Agent, or Firm* — Sheridan Ross P.C.

(57) ABSTRACT

Systems and methods for tracking carriers and other critical path items are provided. The systems and methods comprise structure and functionality to allow for the real-time tracking of pneumatic tube smart carriers and other devices including the use of an IoT capable device, a computer, and an IoT access point. The present disclosure also provides monitoring and analytics capabilities to allow for complex information to be tracked. Such information includes, but is not limited to carrier velocity, air flow, and latch status of the carrier's door.

13 Claims, 9 Drawing Sheets

(56) References Cited

U.S. PATENT DOCUMENTS

| | | | |
|---|---|---|---|
| 6,711,463 B2 * | 3/2004 | Tozuka | B64F 1/366 |
| | | | 700/225 |
| 6,747,560 B2 * | 6/2004 | Stevens, III | G08B 13/2462 |
| | | | 340/572.4 |
| 7,196,627 B2 * | 3/2007 | Rommelmann | G06K 17/00 |
| | | | 235/375 |
| 9,139,383 B2 * | 9/2015 | Hoganson | B65G 51/44 |
| 9,497,572 B2 | 11/2016 | Britt et al. | |
| 9,611,105 B1 * | 4/2017 | Powder | B65G 51/42 |
| 9,656,815 B2 | 5/2017 | Hoganson | |
| 2004/0176872 A1 * | 9/2004 | Eidemiller | B65G 47/50 |
| | | | 700/225 |
| 2004/0223660 A1 * | 11/2004 | Zank | G08B 21/025 |
| | | | 382/277 |
| 2005/0265794 A1 * | 12/2005 | Menday | B65G 51/36 |
| | | | 406/187 |
| 2007/0285240 A1 * | 12/2007 | Sensenig | G08B 13/2462 |
| | | | 340/572.1 |
| 2011/0186630 A1 * | 8/2011 | Hoganson | G05B 11/44 |
| | | | 235/385 |
| 2014/0081448 A1 * | 3/2014 | Hoganson | B65G 51/36 |
| | | | 700/230 |
| 2014/0301793 A1 * | 10/2014 | Doi | G07D 11/50 |
| | | | 406/10 |
| 2014/0330428 A1 * | 11/2014 | Wolfe | B65G 51/44 |
| | | | 700/226 |
| 2015/0025675 A1 | 1/2015 | Valerino, Sr. | |
| 2016/0360369 A1 * | 12/2016 | Wang | H04W 64/00 |
| 2017/0372040 A1 | 12/2017 | Valerino | |

OTHER PUBLICATIONS

"HL7 Segments," interfaceware Blog, May 13, 2008, retrieved from https://blog.interfaceware.com/hl7-segments/, 2 pages.

"Power Management Techniques for Low-Energy IoT Devices," Avnet, Mar. 7, 2017, retrieved from https://www.avnet.com/wps/portal/us/resources/article/power-management-techniques-for-low-energy-iot-devices/, 3 pages.

* cited by examiner

SYSTEMS AND METHODS FOR PNEUMATIC TUBE SMART CARRIER TRACKING

REFERENCE TO RELATED APPLICATIONS

This U.S. Non-Provisional patent application claims the benefit of priority from U.S. Provisional Patent Application Ser. No. 62/849,654, filed May 17, 2019, the entire disclosure of which is hereby incorporated by reference.

FIELD

The present disclosure relates generally to pneumatic tube delivery systems (PTS). More specifically, certain embodiments of the present disclosure relate to systems and methods for dynamically tracking carriers and other devices used by PTS and/or hospital and other settings. In some embodiments, low power internet of things (TOT) devices are provided to enable dynamic tracking.

BACKGROUND

PTS are useful for safely and efficiently transporting materials. Such systems are known to be used for transporting materials such as waste, linens, currency, medical products, and other objects from point to point. The systems typically convey materials between different locations in a building, a development, or other interconnected space. These systems require at least one entry or load point, typically referred to as a load station.

Pneumatic tube carriers are widely used in various institutions. Although these systems are implemented in different forms depending on the nature of operations and transactions carried out at various facilities, the systems generally share basic components. PTS are employed, for example, in financial institutions such as banks to remotely conduct customer transactions in real time. Industrial and retail facilities also employ these systems to transport pay load items such as documents, currency, parts, or merchandise from one location to another. Perhaps the most prevalent and demanding uses are in healthcare institutions such as hospitals, where the need for reliable, verifiable, quick, efficient and secure transport of physical items between remote locations within a large facility, or multiple facilities, tends to be the rule, not the exception. For instance, a PTS within the healthcare industry allows departments in hospitals to send the most delicate and time sensitive payloads from any station to any other station in the system. Items such as pharmaceuticals, lab specimens, blood products, and the like must be passed between different staff members quickly and reliably. It is not uncommon for a hospital to carry out several thousands of transports of delicate payloads on a daily basis.

In healthcare settings, items such as blood work and other test results are highly time sensitive, temperature sensitive and/or impact sensitive. However, the size of certain healthcare facilities and the number of required workstations often push the limits of typical PTS. In current systems that include large numbers of workstations arranged in multiple operating subsystems, it is difficult to monitor the physical position of the carriers. Furthermore, it is difficult to monitor the conditions of the carriers, the contents within the carriers and the network of tubing. Additionally carriers must be removed from the PTS for placement or removal of payloads and current PTS systems are unable to continue the monitoring of the carrier or payloads without cumbersome and obtrusive methods such as bar code or RFID scanners. These methods interfere with the seamless delivery of payloads, place strict limits where the carriers/payloads must placed to use them and are tied to specific PTS manufacturers. Hence, there is a need for a delivery routing system that permits the dynamic tracking of carriers and their contents both inside and outside of the PTS domain, while monitoring the status and conditions of the delivery routing system.

By way of providing additional background and context, U.S. Pat. No. 8,825,203 to Valerino is incorporated in its entirety herein by this reference. The Valerino patent provides a pneumatic tube carrier routing and tracking system having a system control module that captures and presents tracking information associated with sending and receiving carriers. While the Valerino patent uses ID tags and RFID antennas to detect the presence of a carrier when it reaches a station, it does not have the ability to track the physical position of the carrier when it is in between stations, as the present invention enables using an IoT device. The Valentino patent also discusses logging location information of the carrier from inline identifying tag readers disposed throughout the pneumatic tube system, but this information is only logged when the carrier reaches the point in the pneumatic tube system that the tag reader is installed in. The present invention not only provides information of the position of the carrier continuously throughout the pneumatic tube system but throughout the hospital within the limits of provided infrastructure.

SUMMARY

Accordingly, there has been a long-felt but unmet need to provide a system that enables tracking of carriers in a PTS and in real-time. There further exists a need for obtaining and tracking additional information of the carriers and the contents of the carriers to facilitate a speedy recovery of the carriers in time sensitive situations and/or to prioritize a routing and delivery of a carrier. Methods and systems of the present disclosure are not limited, however, to tracking carriers. Various objects including those that are not limited to use within a PTS are contemplated as being provided with tracking features and methods of the present disclosure.

In various embodiments, PTS using smart carriers are provided. In some embodiments, the systems comprise an internet of things (IoT) device embedded in carriers. In one embodiment, the IoT device capabilities are provided by low energy Bluetooth (BLE) features. In such embodiments, the PTS utilize gateways at stations. In such embodiments, the gateway is an in-house solution to ensure continuous communication with the carrier by providing Bluetooth receiving capabilities. In alternative embodiments, the gateways at stations comprise existing technology such as Seeed Studio's BeagleBone® Green, a low cost, open-source, community supported development platform featuring a processor, USB and Ethernet connections, among other things necessary to support an IoT system.

In one embodiment, carriers or other devices to be tracked are provided with a WiFi device. In such embodiments, the carrier or device actively transmits a universally unique identifier (UUID) via WiFi at programmed intervals to supporting infrastructure. In such embodiments, the device(s) provide data to a central processing unit or data processing center for tracking and analyzing the location(s), speed(s) and other features of the carriers.

In one embodiment, carriers and tracked devices of the present disclosure collect and transmit information of the identity of a user who last opened or closed the carrier. In another example of such an embodiment, the identity of the department where the carrier was last opened or closed will be identified based on the physical position of the carrier when opened or closed.

In another embodiment, smart carriers are provided that use two-way communication with existing IoT infrastructure to enable tracking carriers regardless of whether the carrier is provided within a transport pipe of the PTS. In one such embodiment, the two-way communication uses a BLE enabled mobile device.

In some embodiments, systems of the present disclosure send and receive data pertaining to the latch state of the door of the carrier. In such embodiments, the user is alerted if the door of the carrier is not latched. In another embodiment, the smart carrier comprises a local storage device to record telemetry information regarding the carrier and its contents for later retrieval by relevant applications via IoT infrastructure.

In some embodiments, the smart carrier of the system actively transmits a UUID via WiFi at programmed intervals to supporting infrastructure. In such embodiments, the infrastructure communicates information to the facility's datacenter for distribution to the desired applications.

In some embodiments, IoT functionality is provided by an available beacon protocol. In such embodiments, the beacon protocols have SDK or API capabilities. In such embodiments, the IoT functionality is provided by existing beacon protocols such as Apple's iBeacon, a protocol based on Bluetooth low energy proximity sensing and Google's EddyStone, a Bluetooth low energy beacon, similar to the iBeacon, which is implemented without restriction. In another embodiment, the IoT functionality is provided by custom designed beacon protocols.

In some embodiments, carrier content mapping is used to associate contents to the carrier. In some embodiments, the amount of time the contents were in a carrier is tracked. In yet another embodiment, the velocity of the carrier is monitored and tracked. In another embodiment, IoT technology is leveraged to gather PTS data independently of PTS vendors. In some embodiments, the physical locations of multiple carriers in relation to each other and various sending and receiving stations are measured and tracked. In such embodiments, the physical locations of the carriers are tracked at all times to provide a complete and continuously up to date view of the activities taking place within a PTS or similar system.

In some embodiments, systems of the present disclosure comprise and provide a Chain of Custody (CoC) delivery system. For example, in one embodiment, a UUID is assigned to each carrier and the system uses private key signatures to account for the handling of the carrier and its contents. The combination of a UUID and private key signatures ensures a secure method of communicating the movement of carriers in the PTS which preserves privacy of the information being transmitted. Additionally, the CoC system ensures that each user within the PTS facility takes formal charge of the carrier contents, further reducing the risk of losing a carrier along with its contents and providing tracking and accountability within a system.

In some embodiments, the IoT device comprises a low power device consisting of one or more of: a processor, flash memory, dynamic memory (DRAM or PSRAM), Wi-Fi, Bluetooth, BLE, an antenna, peripherals such as capacitive touch sensors, Hall sensors, SD card interface, Ethernet, a Pulse Width Modulation device (PWM), a Universal Asynchronous Receiver/Transmitter (UART), humidity and temperature sensors, motion sensors, ambient light sensors, magnetometers, barometers, and hygrometers. In one embodiment, an IoT device is comprised of discrete components or as a System on a Chip (SoC) containing some or all of the components on a single IC. In other embodiments, systems are provided with and utilize an ESP 32 beacon with a dual mode WiFi/BLE module. In such embodiments, the ESP 32 dual mode module broadcasts an Eddystone beacon. The ESP 32 is a series of low-cost, low-power system on a chip microcontrollers with integrated Wi-Fi and dual-mode Bluetooth. The ESP 32 includes a processor, memory, peripheral interfaces, and ultra-low power analog pre-amplifier among other components.

The term "computer-readable medium" as used herein refers to any computer-readable storage and/or transmission medium that participate in providing instructions to a processor for execution. Such a computer-readable medium can be tangible, non-transitory, and non-transient and take many forms, including but not limited to, non-volatile media, volatile media, and transmission media and includes, without limitation, random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, an EPROM, a FLASH-EPROM, a solid state medium like a memory card, any other memory chip or cartridge, a carrier wave as described hereinafter, or any other medium from which a computer reads. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "computer readable storage medium" is contemplated as comprising but is not limited to, an electronic, magnetic, optical, electromagnetic, infrared, or semiconductor system, apparatus, or device, or any suitable combination of the foregoing. More specific examples (a non-exhaustive list) of the computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that contains or stores a program for use by or in connection with an instruction execution system, apparatus, or device.

The term "means" as used herein shall be given its broadest possible interpretation in accordance with 35

U.S.C., Section(s) 112(f) and/or 112, Paragraph 6. Accordingly, a claim incorporating the term "means" shall cover all structures, materials, or acts set forth herein, and all the equivalents thereof. Further, the structures, materials, or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

The Summary is neither intended nor should it be construed as being representative of the full extent and scope of the present disclosure. The present disclosure is set forth in various levels of detail in the Summary, the attached drawings, and the Detailed Description, and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of these inventions.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings and skill and knowledge of the relevant art are within the scope of the presented inventions.

Figure 1:
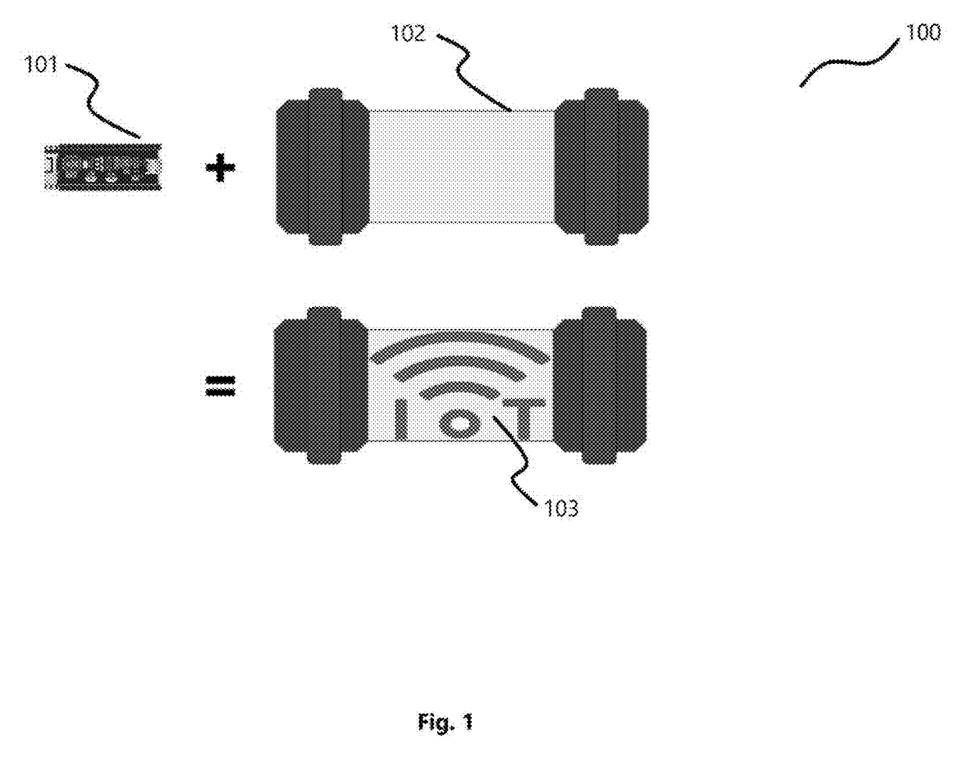
FIG. 1 illustrates a smart carrier device according to one embodiment of the present disclosure.

FIG. 1 depicts a carrier system 100 according to one embodiment of the present disclosure. Although a carrier is shown in FIG. 1, it will be expressly recognized that features, systems, devices and methods of the present disclosure can be applied to various items that require or benefit from tracking. Such items include, but are not limited to, carts, drug containers, tools, persons, documents, files, etc. As shown in FIG. 1, an IoT device 101 is provided and embedded in a carrier 102. The IoT device 101 is contemplated as comprising a communication device including but not limited to a GPS tracking device and/or a Bluetooth device. The carrier 102 is contemplated as comprising a known carrier including, for example, those shown and described in U.S. Pat. No. 5,901,966 to Valerino et al., which is hereby incorporated by reference in its entirety. The resulting structure is a "smart" carrier 103 that is provided with communication features and tracking features.

In some embodiments, an IoT device 101 is embedded on the inside of a carrier 102, and the IoT device 101 comprises the ability to be detected and read from various remote locations. Remote locations include, for example, a terminal or station that is remote from the carrier when the carrier is provided in a PTS. In various embodiments, the IoT device 101 is operable to detect when the carrier 103 is opened and/or closed and communicate information related to opening and closing actions and the status of the carrier door to a computer (not shown in FIG. 1, but see 303 in FIG. 3). In various embodiments, the carrier 102 comprises one or more materials that permits the transmission of WiFi and Bluetooth signals and does not substantially interfere with the communication abilities of the IoT device 101.

In some embodiments, the IoT device 101 is provided in a sleeve and the sleeve is selectively insertable within a carrier 102. In such embodiments, the IoT device 101 and/or sleeve are easily removable from the carrier 103. Carriers and other devices and items equipped with features of the present disclosure including, for example, an IoT device 101 can be traced or tracked by users and systems regardless of the physical position of the carrier or device. For example, physical location of a carrier or device can be tracked and monitored regardless of whether the carrier or device is provided within a transport pipe of a PTS or is located elsewhere (off-site, for example).

In various embodiments, IoT devices including transceivers, emitters, and other IoT devices disclosed herein are provided in combination with carriers. In some embodiments, one or more IoT devices are secured to a carrier via adhesives or fasteners. Embodiments of the present disclosure contemplate the ability to retro-fit an existing PTS system and one or more carriers with devices and functionality of the present disclosure. These embodiments include methods, systems and devices for attaching IoT devices (e.g. GPS components and transmitters) to existing carriers such that functionality of the present disclosure can be applied to an existing system with minimal replacement or modification of components of an existing system. In some embodiments, a kit is provided that provides enhanced tracking functionality to an existing PTS. Kits of the present disclosure are contemplated as comprising at least one and preferably a plurality of IoT devices and means to secure the IoT device(s) to at least one carrier of an existing system. In some embodiments, kits of the present disclosure further comprise software that is operable to be installed on existing devices. Existing devices for receiving software of kits of the present disclosure are contemplated as existing personal computers, tablets, smartphones, etc. Kits of the present disclosure allow for an existing PTS that may or may not already comprise tracking features to be upgraded or enhanced with additional tracking and management features as shown and described herein. Kits and embodiments of the present disclosure allow for such upgrades at minimal cost and with minimal labor.

In one embodiment, the smart carrier 103 is a transportation device for a hospital system that utilizes sending and receiving stations throughout the facility. In such embodiments, the pneumatic tube smart carrier 103 is designed and programmed to interact with existing infrastructure within the facility, which provides a simple and convenient method of integrating the pneumatic tube smart carrier 103.

Figure 2:
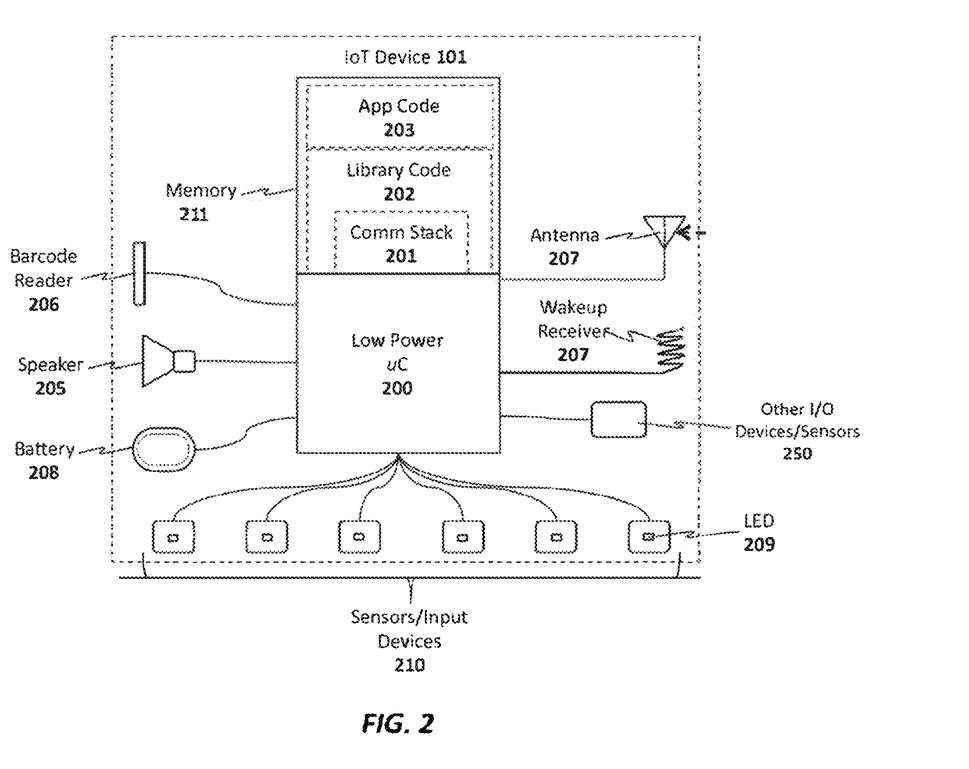
FIG. 2 illustrates an IoT device in accordance with one embodiment of the present disclosure.

As illustrated in FIG. 2, an exemplary embodiment of an IoT device 101 includes a memory 211 for storing software 201, program code 202, 203 and data and a low power microcontroller 200 for executing the program code and processing the data. In some embodiments, the memory 211 is a volatile memory such as dynamic random-access memory (DRAM) or is a non-volatile memory such as Flash memory. In some embodiments, a non-volatile memory is used for persistent storage and a volatile memory is used for execution of the program code and data at runtime. Moreover, the memory 211 is integrated with the low power microcontroller 200 or coupled to the low power microcontroller 200 via a bus or communication fabric. The underlying principles of the invention are not limited to any particular implementation of the memory 211. As illustrated, the program code includes application program code 203 defining an application-specific set of functions to be performed by the IoT device 101 and library code 202 comprising a set of predefined building blocks which is utilized by the application developer of the IoT device 101. In other embodiments the application program code 203 is hosted by a Real Time Operating System (RTOS). A RTOS serves real-time applications that process data as it comes in, largely without buffer delays.

In one embodiment, the library code 202 comprises a set of basic functions required to implement an IoT device such as a communication protocol stack 201 for enabling communication between each IoT device 101 and an IoT access point. As mentioned, in one embodiment, the communication protocol stack 201 comprises a Bluetooth LE protocol stack. In this embodiment, Bluetooth LE radio and antenna 207 is integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user. In addition, the illustrated embodiment includes a battery 208 for supplying power to the low power microcontroller. In one embodiment, a non-chargeable coin cell battery is used. However, in an alternate embodiment, an integrated rechargeable battery is used (e.g., rechargeable by connecting the IoT device to an AC power Supply (not shown)).

In some embodiments, a speaker 205 is also provided for generating audio. In one embodiment, the low power microcontroller 200 includes audio decoding logic for decoding a compressed audio stream (e.g., such as an MPEG-4/Advanced Audio Coding (AAC) stream) to generate audio on the speaker 205.

Alternatively, the low power microcontroller 200 and/or the application code/data 203 includes audio to provide feedback to a user as the user enters selections via the input devices 210. In one embodiment, one or more other alternate I/O devices or sensors 250 is included on the IoT device 101 based on the particular application for which the IoT device 101 is designed. For example, an environmental sensor is contemplated as being included to measure temperature, pressure, humidity, etc. A security sensor and/or door lock opener is included if the IoT device is used as a security device. Such examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

Figure 3:
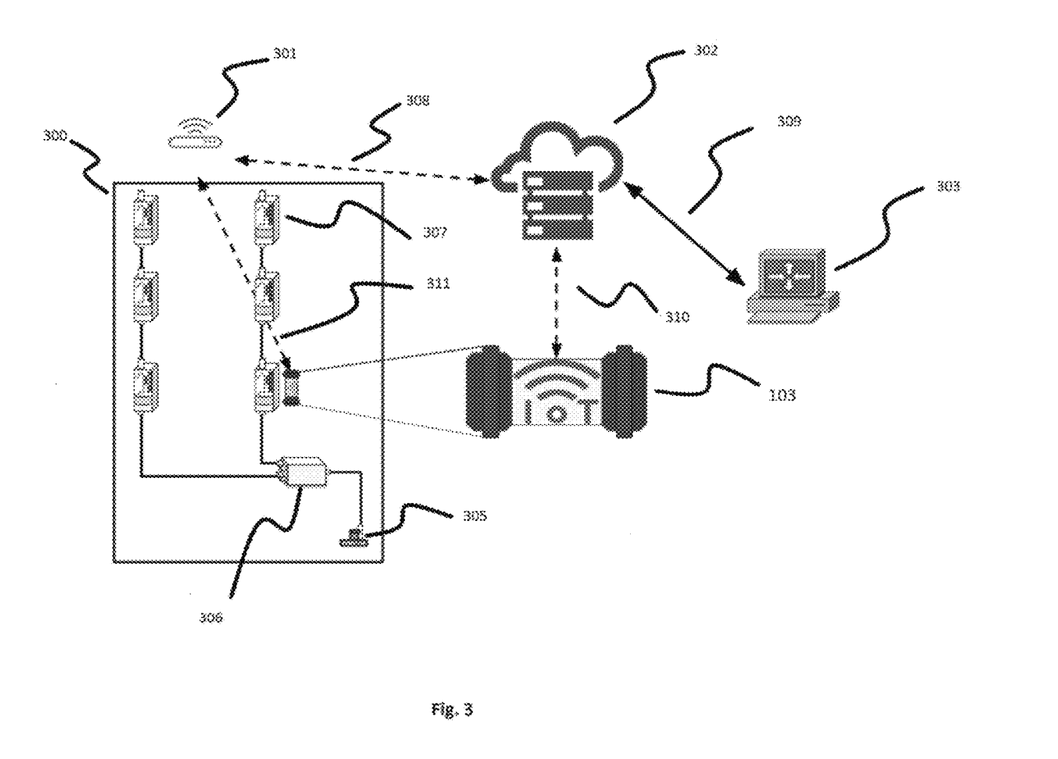
FIG. 3 illustrates a system and carrier according to one embodiment of the present disclosure.

As shown in FIG. 3, a system according to one embodiment of the present disclosure is shown. The system comprises a PTS system with a network 300 of transport piping and stations 307. Carriers 103 are transported through the network 300 and are inserted and removed from the network 300 via the stations 307. A blower 305, a diverter 306, and other known devices and systems for transporting carriers and materials through the network 300 are provided. As shown in FIG. 3, the carrier 103 comprises a smart carrier in accordance with one or more embodiments of the present disclosure and wherein the smart carrier 103 comprises communication features and is in two-way communication 311 with the system via a router 301 (for example). Although one router 301 is shown in FIG. 3, such devices may be provided and distributed throughout a system and a plurality of routers 301 are contemplated particularly where additional signal strength is needed or where other demands require it. The router 301 is further provided in two-way communication 308 with a server 302 which may comprise, for example, a cloud-based server and/or a terminal or personal computer 303 having a user interface. The system of FIG. 3 thus provides a PTS with a network 300 operable to receive and transport carriers 103. The carriers 103 are provided in constant contact or near-constant contact with additional components of the system including, for example, the server(s) 302 and a computer 303. Wireless features provided within the smart carrier 103 are operable to transmit information to the server 302 and computer 303 regardless of the location or status of the carrier 103. Accordingly, location and other aspects of a carrier (and multiple carriers) can be tracked, recorded, and monitored at all times. In contrast with existing devices that only track and log carrier location at discrete locations (e.g. upon RFID scanning when inserted into a station 307 or when passing a scanning check point), the system of FIG. 3 is capable of monitoring carrier location and other conditions constantly. If, for example, a user desires to determine the exact location of a specific carrier at any moment, the user may communicate with the computer 303 and related user-interface to establish a communication link with a specific carrier. In some embodiments, systems of the present disclosure provide a user-interface with various options for locating carriers. In some embodiments, a drop-down option is provided such that a user may select one or more carriers in-transit within the system and receive on-demand information related to specific carriers. As further shown in FIG. 3, the carrier(s) 103 are contemplated as being in two-way communication with the server 302 via the router 301, or in direct two-way communication 310 with the server.

In various embodiments, systems of the present disclosure comprise logic and software that is operable to maximize transportation efficiencies of carriers within the system. For example, the server 302 and/or computer 303 are contemplated as constantly monitoring the status of various carriers and adjusting one or more of travel path, speed, and station access based on various conditions. Such functions are operable to be performed with out without user input or intervention. Further, it is contemplated that the system is operable to send updates and alerts to users, remote computers, smartphones, tablets, and other devices.

In various embodiments, including that shown in FIG. 3, carriers 103 of the present disclosure communicate with the system via IoT access point(s) 301 using Bluetooth or WiFi. The IoT access point 301 is capable of communicating with and delivering information to a network server(s) 302. In some embodiments, the monitoring and analytics system 303 monitors all PTSs 300 in a facility and receives and sends data to the computer 302. In some embodiments, the data from the IoT access point 301 is aggregated and analyzed at the computer 302 and sent to the monitoring system 303 for further analysis and presentation. One aspect of the embodiment involves the monitoring and analytics system 301 providing a tracking view of all pneumatic tube smart carriers 103 within the facility. In some embodiments the carrier 103 transmits data at regular intervals and provides at a minimum information of the physical position of the pneumatic smart carrier 103. In other embodiments, the carrier 103 stores the data locally to be retrieved at a later time.

Although carriers 103 of the embodiment of FIG. 3 are contemplated as comprising IoT features as discussed herein, it is further contemplated that the carriers can also be tracked by other means. For example, smart carriers 103 of the present disclosure are further contemplated as being scanned by RFID checkpoints and similar features as an additional means of tracking carriers. In addition to location, carriers 103 of the present disclosure are operable to communicate and convey information related various other parameters of the carrier including, but not limited to, latch or door status, speed, content information, etc.

Figure 4:
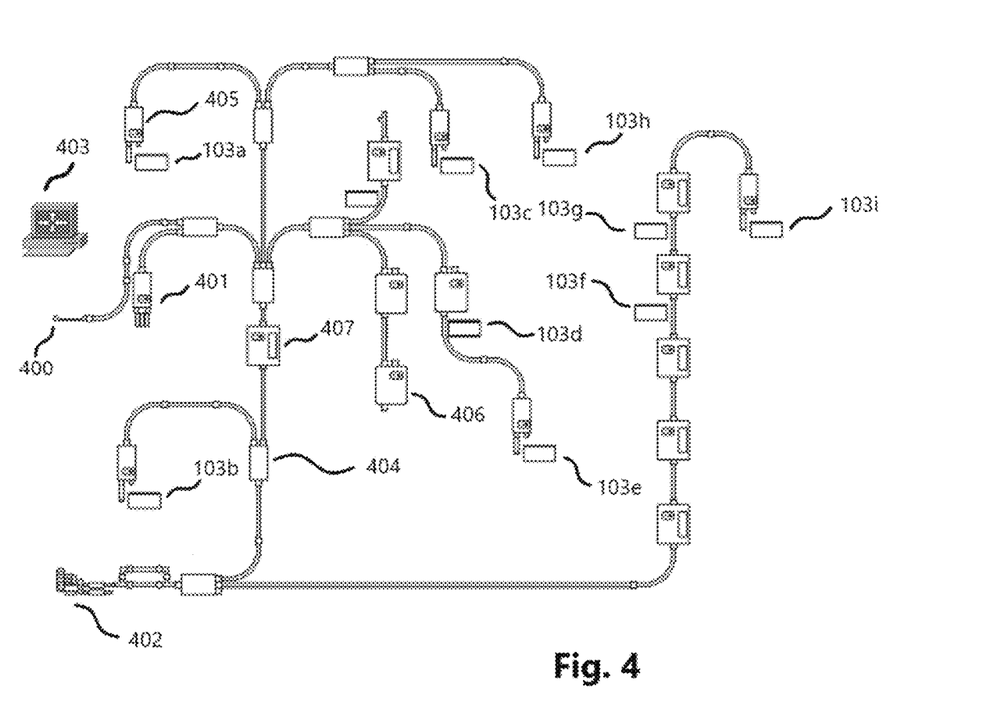
FIG. 4 illustrates a system according to one embodiment of the present disclosure.

FIG. 4 illustrates an embodiment of a PTS according to an embodiment of the present disclosure. The PTS of FIG. 4 is contemplated as being installed or provided in a hospital or similar facility and is operable to transmit materials in carriers throughout the facility. As shown, the PTS includes an open end station 400, a multi sending station 401, a blower 402, a computer 403, one or more diverters 404, a basic station 405, an intermediate station 406, an advanced station 407, and multiple carriers 103a-i.

Various embodiments of the present disclosure, including that shown in FIGS. 3-4, comprise the ability to monitor and track carrier status and information as well as station status and information. In certain embodiments, stations 405, 406, and 407 are equipped with at least one of WiFi and BLE. Smart carriers 103a-i are equipped with an IoT device compatible to communicate with the WiFi and BLE technology installed in stations 405, 406 and 407, and the computer 403.

In alternative embodiments, a combination of basic stations, intermediate stations, and advanced stations is utilized based on the needs of the hospital to maximize efficiency and minimize cost. In such embodiments, the basic station 405 has a limited set of functionalities such as receiving and sending the carriers without displaying any information at the stations. The intermediate station 406 contains more functionalities than the basic station, but less functionalities than the advanced station. In one such embodiment the intermediate station 406 displays a screen that informs users of the presence and movement of carriers 103 between the intermediate station and adjacent stations.

In some embodiments an advanced station 407 is provided that comprises a screen that informs users of the presence and movement of carriers 103a-i throughout the PTS. In alternative embodiments, each of the carriers 103a-i communicates with each station 405, 406, and 407 to provide velocity, physical position, and carrier content to the computer 403. In such embodiments, the computer 403 displays the information of multiple carriers 403a-i in real-time and immediately as any status being reported by the carrier changes. In other such embodiments, the computer 403 coordinates with all the stations 405, 406, and 407 to ensure a smooth and uninterrupted travel path of the carriers 103a-i. In some embodiments, carriers 103a-i are equipped with Global Position System (GPS) features, which continuously broadcasts precise location and time information to the monitoring and analytics system 403. In such embodiments, the carrier transmits its physical position from anywhere within the PTS without relying on scanning at the stations.

Figure 5:
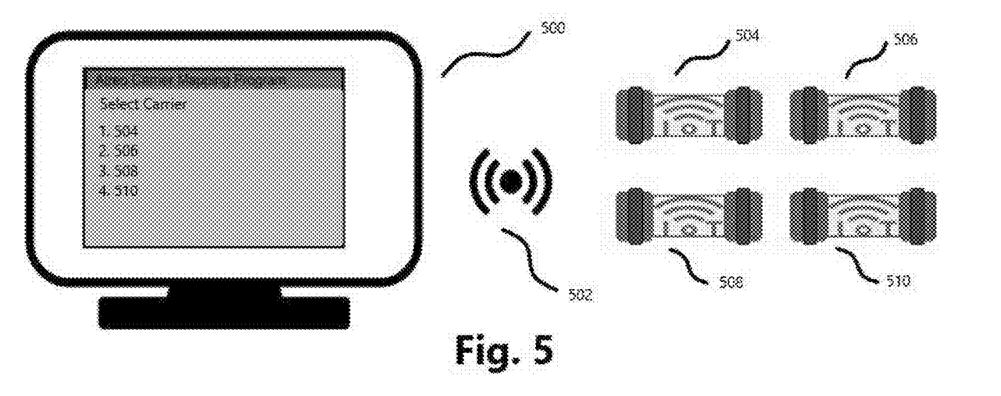
FIG. 5 illustrates a system and mapping feature according to one embodiment of the present disclosure.

FIG. 5 illustrates a plurality of carriers 504, 506, 508, 510 in wireless communication with a system. The system comprises a computer 500 having a user-interface that is operable to display information related to the carriers and receive and send communications from a user. The carriers are provided in communication with the computer or 500 and/or a server or cloud-based platform (not shown in FIG. 5) via a wireless device 502 which is contemplated as comprising any one or more of a BLE device, a wireless router, and a network. The computer 500 comprises an interface or GUI that allows a user to view the status, position, etc. of the various carriers in the system. For example, a user may select a particular carrier from a drop-down menu and be provided with various information related to the carrier including, for example, speed, position, estimated time of arrival at a destination, carrier contents, and door or latch status. The GUI is further operable to automatically generate and provide alerts (visual, aural, etc.) to a user if a problem is encountered with one or more carriers in the system. In some embodiments, the computer 500 and related GUI is operable to transmit information to the system. For example, if a user desires to disable access to a particular load station in the system or re-route a carrier's intended path, the user may do so via the computer 500 and GUI.

In some embodiments, systems of the present disclosure further comprise an application on a Bar Coded Medication Administration (BCMA) or equivalent system. The carriers are operable to transmit their carrier numbers or ID to the BCMA system. In such embodiments, the application orders the set of carriers in a list using Received Signal Strength Indicator (RSSI), where the list is an indication of how close each carrier is to a particular station. RSSI is a measurement of power present in a received radio signal. In other embodiments, the carriers are identified by a label on the carrier.

Figure 6:
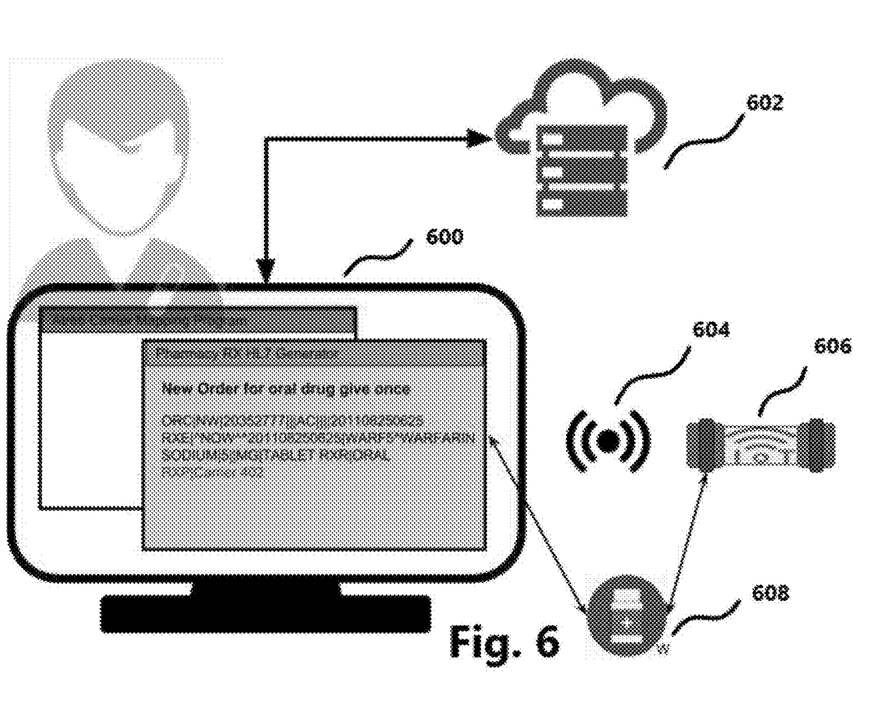
FIG. 6 provides a system and mapping feature according to one embodiment of the present disclosure.

FIG. 6 illustrates a system according to one embodiment of the present disclosure with a BCMA or equivalent system 600, a database 602, a wireless transmission system 604 (e.g. wireless router or network), at least one carrier 606, and carrier contents 608. The carrier contents 608 may comprise, for example, pharmaceutical product(s) for delivery within a system. In one embodiment, the system comprises a Health Level 7 (HL7) messaging database. In HL7 databases, each segment of the message contains one specific category of information relevant to the operation of a hospital, providing for an efficient and accurate transmission of information throughout a hospital. The database 602 is contemplated as residing on a server, a data center, and/or a cloud-based system. The BCMA system 600 receives order information of a medical product 608. The order information is sent to the HL7 database 602 and is stored as a new segment appended to the database. In alternative embodiments, the HL7 database 602 transmits its segments to the carrier 606 via the wireless protocol or network 604. Similarly, the carrier 606 transmits information to the database 602. In some embodiments, a separate connection is established for the exchange of information between the database 602 and the carrier 606. In some embodiments, the BCMA system 600 is a system designed in-house within the facility. In other embodiments the BCMA is a third-party application which integrates with the facility's PTS infrastructure. In some embodiments, the PTS does not include the BCMA system 600 and the HL7 database 602 directly receives information of the medical product 608.

Figure 7:
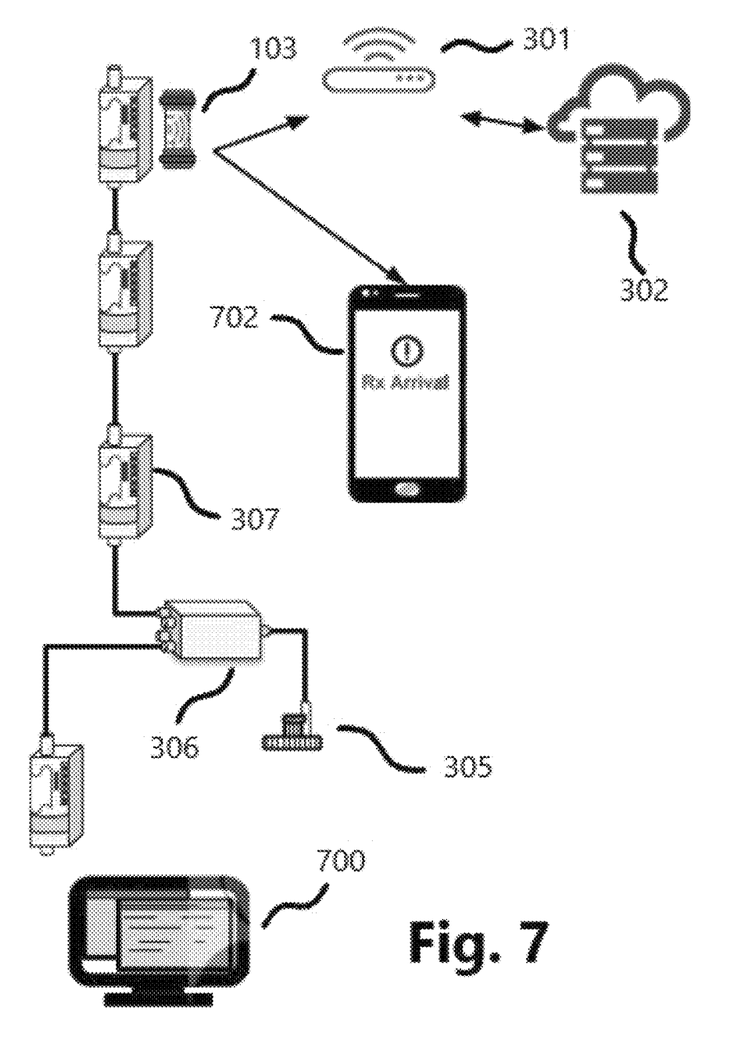
FIG. 7 illustrates a system according to one embodiment of the present disclosure.

FIG. 7 illustrates a system according to one embodiment of the present disclosure and various components and features thereof. As shown, a system is provided that comprises at least one carrier 103 or similar device to be tracked. The carrier 103 is moveable throughout a PTS (for example) having a plurality of stations 307 for ingress and egress of carriers to and from the system. A blower 305 and diverter 307, as well as other known components of a PTS, or provided to enable transport. Various components of the system, including the at least one carrier 103 are in wireless communication with additional aspects of the system including a server 302, CPU and/or display 700 and a wireless device 702 via a wireless network 301 or wireless protocol. The wireless device 702 is contemplated as comprising but is not limited to a smartphone, a tablet, and a laptop. The system contemplates that various information of each carrier is accessible and visible via the CPU 700. Such information is also contemplated as being provided to the wireless device 702. In some embodiments, the wireless device is configured to and operable to receive information from the system and display that information in the form of alerts. For example, the wireless device 702 may provide a simple alert that a carrier sent by that user has been received at its destination. The system is contemplated as being further operable to provide an alert or indication that the carrier has been opened and/or closed to confirm delivery of contents.

In some embodiments, the wireless device 702 provides a transmission to the CPU 700 when the contents of the carrier 103 have been removed. In one such embodiment, the wireless device 702 utilizes the latch state transmitted by the carrier 103 to indicate the carrier has been opened. In another embodiment, the wireless device 702 displays an option for the user receiving the carrier 103 to acknowledge the receipt of the content of the carrier 103. In one embodiment, the acknowledgement display is in the form of a "content received" indication. In yet another embodiment, the wireless device 702 provides an additional alert to indicate that the contents of the carrier 103 have been administered to a patient. In some embodiments, the wireless device 702 provides an estimated time of arrival of a carrier 103 from a nearby station to a user expecting to receive the carrier 103. In alternative embodiments, a user is provided an estimated time of arrival of a carrier 103 located anywhere within the PTS upon request by the user.

Figure 8:
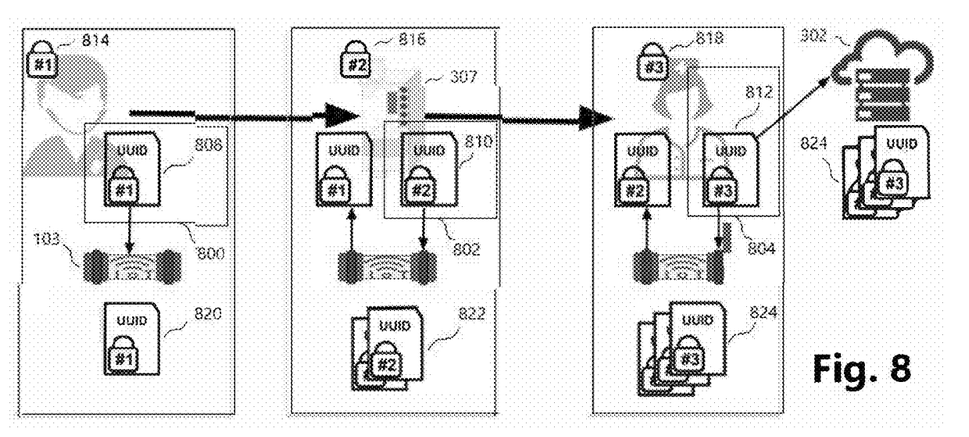
FIG. 8 illustrates a system according to one embodiment of the present disclosure.

As illustrated in FIG. 8, one embodiment of a PTS is provided that includes a secure method of transmitting the status of the carrier 103. The secure method provides that the senders, receivers, and all handlers of the carrier 103 have the ability to provide status information upon receipt and delivery of the carrier 103.

As shown, the system comprises Chain of Custody (CoC) tokens 800, 802, and 804, private keys 814, 816, and 818, Universally Unique Identifiers (UUID) 808, 810, 812, a database 302, and CoC records 820, 822, and 824. In some embodiments, the UUID is utilized to identify timestamps of various points such as the sending and receiving stations as well as the original sending station and final destination. The UUID is also utilized to identify other additional information such as the contents of the carrier.

In the embodiment of FIG. 8, a user may select a carrier 103 to be used for a transaction. As part of carrier content mapping, a UUID 808 is created and digitally signed with the user's private key 814 and transmitted to the carrier 103. In some embodiments, the UUID 808 is sent to a database or data center of the facility for storage, tracking, reporting, etc. In other embodiments the private key 814 is sent to the database or data center performing the mapping. The combination of the UUID 808 and private key 814 forms the first CoC token 800. In some embodiments the token 800 forms a complete CoC record 820. The carrier 103 is then sent to a destination station 307 and upon arrival at the destination station the CoC token 800 is transmitted to the station. A second UUID 810 is signed with the station's private key 816 to form a new CoC token 802. The CoC token 800 is added to the CoC record 820 to for a new and updated CoC record 822 which includes CoC tokens 800 and 802. In some embodiments the carrier 103 travels to multiple other destination stations 307 where it will be assigned new UUID and private keys at each station which is then added to form updated CoC records.

In alternative embodiments, the carrier 103 is received by a user at a final destination station 307. The user acknowledges receipt of the contents by providing a private key 818 which together forms a new CoC token 804. The token 804 is then added to the CoC record to form an updated CoC record 824. In some embodiments, the receipt of the content is tied to a latch state of the carrier. In one such embodiment, an alarm is triggered if the contents of the carrier 103 are removed without the CoC token 804 being generated. CoC tokens of the present disclosure are transmitted to the carrier 103 and/or sent to a database or datacenter 302 of the facility.

Figure 9:
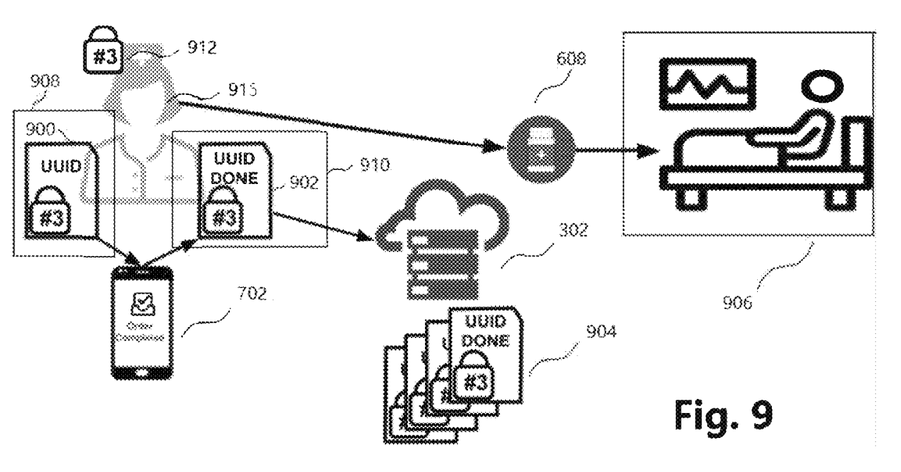
FIG. 9 illustrates a system and process according to one embodiment of the present disclosure.

FIG. 9 depicts a system according to an embodiment of the present disclosure for safely and securely transporting, delivering, and administering drugs to a patient, for example. As shown, a patient or recipient 906 intended to be provided with a drug or medicament 608 is provided. The recipient 906 of FIG. 9 is contemplated as comprising a patient in a hospital but may comprise various other end destinations or recipients. For example, a location or person to which documents or other materials are intended to be delivered may be provided as the end destination of the system. A first user 915 is shown and is provided with a private key 912. The first user 915 is contemplated as comprising a first receiver and/or handler of material (e.g. drugs) or information. A UUID 900 is generated by the system and associated with the delivered materials 608. The first user 915 signs for or otherwise acknowledges receipt of the materials 608 and the private key 912 and UUID 900 form a CoC token 908. UUID 900 is generated once the carrier 103 arrives at a final destination station and the user signs for the receipt of the contents of the carrier using a private key 912 which together forms CoC token 908. Token 908 provides a record and confirmation of the material 608 having been delivered to a particular location and as having been received by a particular person. The first user is then able to deliver and/or administer the material 608 to a recipient 906. Once administration is completed, the first user 915 enters a command in a wireless device 702 (for example) to indicate that delivery and administration of the material is complete. This input creates a UUID "Done" entry 902 using the private key 912 of the first user and the UUID Done 902 generates a new CoC token 910, which is then added to the CoC record 904. The CoC token 904 is then sent to the database 302 of the facility for storage, analysis, etc.

Embodiments of the present disclosure contemplate that various users may receive and handle materials 608 prior to administrating the materials to a patient or recipient. For example, the first user 915 may receive a carrier containing the materials 608 and convey the carrier and/or materials 608 to a second user and the second user is then responsible for administering the drug to a patient. In such circumstances, the first user 915 may generate a token reflecting the transfer, and the UUID Done token 910 is not created unless and until the second or final user administers the drug or material 608 to the patient.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purpose of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A system for tracking a pneumatic tube carrier, the system comprising:
a pneumatic tube carrier operable to house contents and be transmitted through a pneumatic transfer system;
wherein the pneumatic tube carrier comprises an on-board wireless communication device;
a central processing unit configured to receive data, the data comprising a first segment and a second segment;
a database for storing data and wherein the data comprises the second segment;
a wireless access point, wherein the wireless access point is provided in wireless communication with the pneumatic tube carrier and the central processing unit, wherein the first segment is transmitted from the on-board wireless communication device of the pneumatic tube carrier to the central processing unit via the wireless access point;
wherein the central processing unit receives, via the wireless access point, the second segment from the database and appends the second segment to the first segment; and
wherein the central processing unit transmits the second segment and the first segment to the pneumatic tube carrier via the wireless access point.

2. The system of claim 1, wherein the wireless communication device is provided within an interior volume of the pneumatic tube carrier.

3. The system of claim 2, wherein the wireless communication device is selectively insertable and removable from the pneumatic tube carrier.

4. The system of claim 1, wherein the central processing unit comprises a computer with memory.

5. The system of claim 1, wherein the pneumatic tube carrier comprises an access door to permit access to an interior volume of the pneumatic tube carrier and the access door is in communication with the central processing unit via the on-board wireless communication device.

6. The system of claim 1, wherein the central processing unit comprises a GUI and the GUI is operable to provide information related to at least one of a physical location, speed, and status of the pneumatic tube carrier.

7. A system for tracking a pneumatic tube carrier, the system comprising:
a pneumatic tube carrier operable to house contents and be transmitted through a pneumatic transfer system;
wherein the pneumatic tube carrier comprises an on-board wireless communication device;
a central processing unit configured to receive data, the data comprising a first segment and configured to receive a second segment;
a database for storing data and wherein the data comprises the second segment;
a wireless access point, wherein the wireless access point is provided in communication with the pneumatic tube carrier and the central processing unit, wherein the first segment is transmitted from the on-board wireless communication device of the pneumatic tube carrier to the central processing unit via the wireless access point; and wherein the central processing unit receives, via the wireless access point, the second segment from the database and appends the second segment to the first segment; and wherein the central processing unit transmits the second segment and the first segment to the pneumatic tube carrier via the wireless access point.

8. The system of claim 7, further comprising a wireless handheld device operable to scan the pneumatic tube carrier.

9. The system of claim 8, wherein the wireless handheld device comprises a smartphone or a tablet.

10. The system of claim 8, wherein the system is operable to generate a unique identifier code upon confirmation that the pneumatic tube carrier has been received by a user, and the unique identifier code is transmitted to the central processing unit.

11. The system of claim 10, wherein the unique identifier code comprises information specific to the user.

12. The system of claim 11, wherein the unique identifier code further comprises information related to at least one of an opening and a closing of a door provided on the pneumatic carrier.

13. The system of claim 1, wherein each of the first segment and the second segment include information about at least one of the contents of the pneumatic tube carrier and a hospital associated with the contents.

* * * * *